(12) United States Patent
Schneider et al.

(10) Patent No.: US 10,052,654 B2
(45) Date of Patent: Aug. 21, 2018

(54) DEPOSITION DEVICE FOR CONTROLLED DEPOSITION OF REINFORCING FIBER BUNDLES

(71) Applicant: TEIJIN CARBON EUROPE GMBH, Wuppertal (DE)

(72) Inventors: Markus Schneider, Düsseldorf (DE); Björn Lehmhaus, Dortmund (DE)

(73) Assignee: TEIJIN CARBON EUROPE GMBH, Wuppertal (DE)

( * ) Notice: Subject to any disclaimer, the term of this patent is extended or adjusted under 35 U.S.C. 154(b) by 549 days.

(21) Appl. No.: 14/440,673

(22) PCT Filed: Oct. 11, 2013

(86) PCT No.: PCT/EP2013/071258
§ 371 (c)(1),
(2) Date: May 5, 2015

(87) PCT Pub. No.: WO2014/067762
PCT Pub. Date: May 8, 2014

(65) Prior Publication Data
US 2015/0298163 A1    Oct. 22, 2015

(30) Foreign Application Priority Data
Nov. 5, 2012    (EP) .................................... 12191275

(51) Int. Cl.
*B05B 12/00* (2018.01)
*B05D 1/02* (2006.01)
(Continued)

(52) U.S. Cl.
CPC ................ *B05D 1/02* (2013.01); *B05B 12/00* (2013.01); *B05D 1/28* (2013.01); *B29B 11/16* (2013.01);
(Continued)

(58) Field of Classification Search
CPC .. B05B 12/00; B05D 1/02; B05D 1/28; B29B 11/16; B29C 70/305; B29C 70/38; B29C 70/545
(Continued)

(56) References Cited

U.S. PATENT DOCUMENTS 3,011,257 A    12/1961    Bamberger
3,810,805 A    5/1974    Goldsworthy et al.
(Continued)

FOREIGN PATENT DOCUMENTS

DE    202010017556 U1    1/2012
EP        1 144 738 B1    2/2004
(Continued)

OTHER PUBLICATIONS

Mach 17, 2014 Search Report issued in International Application No. PCT/EP2013/071258.
(Continued)

*Primary Examiner* — Alexander M Weddle
(74) *Attorney, Agent, or Firm* — Oliff PLC (57) ABSTRACT

A deposition device for controlled deposition of reinforcing fiber bundles on a surface, including a deposition head and a controllable positioning unit, means for providing at least one strand of reinforcing fibers provided with a binder, and a first conveying device, arranged on the deposition head conveys the at least one strand to the deposition head, wherein, when viewed in the conveying direction, means for spreading the at least one strand are arranged on the deposition head, and the deposition head has a second conveying device arranged after the first conveying device, a longitudinal splitting device, arranged between the first and second conveying devices, with at least one splitting element for splitting the at least one strand along the longitudinal extension thereof into two or more partial strands, and a
(Continued)

cut-to-length unit arranged after the second conveying device for cutting-to-length the two or more partial strands into fiber bundles.

20 Claims, 4 Drawing Sheets

(51) Int. Cl.
  *B05D 1/28*   (2006.01)
  *B29B 11/16*   (2006.01)
  *B29C 70/38*   (2006.01)
  *B29C 70/54*   (2006.01)
  *B29C 70/30*   (2006.01)

(52) U.S. Cl.
  CPC ............ *B29C 70/305* (2013.01); *B29C 70/38* (2013.01); *B29C 70/545* (2013.01)

(58) Field of Classification Search
  USPC ......................................................... 118/324
  See application file for complete search history.

(56) References Cited

U.S. PATENT DOCUMENTS

| | | |
|---|---|---|
| 5,022,952 A | 6/1991 | Vaniglia |
| 5,866,253 A | 2/1999 | Philipps et al. |
| 6,251,185 B1 | 6/2001 | Morrison et al. |
| 2009/0229760 A1* | 9/2009 | Hamlyn ................ B29C 70/384 156/433 |

FOREIGN PATENT DOCUMENTS

| | | |
|---|---|---|
| EP | 1 394 295 A2 | 3/2004 |
| EP | 1 723 272 B1 | 6/2008 |
| EP | 2 351 880 A2 | 8/2011 |
| JP | 2008-254191 A | 10/2008 |
| WO | 98/22644 A1 | 5/1998 |
| WO | 02/055770 A1 | 7/2002 |
| WO | 2005/095080 A1 | 10/2005 |
| WO | 2011/045172 A1 | 4/2011 |
| WO | 2012/072405 A1 | 6/2012 |

OTHER PUBLICATIONS

May 5, 2015 International Preliminary Report on Patentability and Written Opinion issued in International Application No. PCT/EP2013/071258.

* cited by examiner

DEPOSITION DEVICE FOR CONTROLLED DEPOSITION OF REINFORCING FIBER BUNDLES

BACKGROUND

The present disclosure relates to a fiber deposition device for controlled deposition of reinforcing fibers on a surface.

Components made from fiber composite materials are increasingly used, especially in the aerospace industries, yet also e.g. in machine building industry or the automotive industry. Fiber composite materials often offer the advantage of lower weight and/or higher strength over metals. The volume percentage of the reinforcing fibers and especially also the orientation of the reinforcing fibers have a determining effect on the resistance of the components, in particular in view of the rigidity and strength thereof. Nevertheless, heavy-duty materials and components of this type must still be able to be produced cost effectively in order to be economically attractive.

To produce composite components of this type, so-called fiber preforms are initially produced from reinforcing fibers in an intermediate step. These are textile, semi-finished products in the form of two- or three-dimensional configurations made from reinforcing fibers, wherein the shape can already be nearly the shape of the final component. For embodiments of fiber preforms of this type that consist substantially only of the reinforcing fibers, and for which the matrix percentage required for the production of the component is still at least largely absent, a suitable matrix material is incorporated in the fiber preform in additional steps via infusion or injection, or also by application of vacuum. Subsequently, the matrix material is cured as a rule at increased temperatures and pressures to form the finished component. Known methods for infusion or injection of the matrix material are the liquid molding (LM) method or methods related thereto such as resin transfer molding (RTM), vacuum assisted resin transfer molding (VARTM), resin film infusion (RFI), liquid resin infusion (LRI), or resin infusion flexible tooling (RIFT). The fiber material used to produce the fiber preforms can also already be pre-impregnated e.g. with low amounts of a curable plastic material, i.e., a binder material, in order to improve the fixing of the reinforcing fibers in the fiber preform. Pre-impregnated yarns of this type are described for example in WO 2005/095080.

To produce fiber preforms from reinforcing fiber bundles, automated processes are often used in which the fiber bundles are deposited by means of controlled deposition heads or also fiber deposition devices on or in corresponding molds, wherein the deposition can also take place by spraying the fiber bundles on or in the molds. In general, in this case, a continuous yarn of reinforcing fibers is fed to the deposition heads, which yarn is then cut to the desired bundle length in the deposition head or in the fiber deposition device by means of suitable cutting devices. Deposition heads of this type with a device for cutting the fiber strands to length are disclosed for example in WO 2011/045172 or U.S. Pat. No. 3,011,257.

Fiber preforms of this type can, for example, be produced in that short-cut reinforcing fibers, together with a binder material, are sprayed and dispersed on an air-permeable screen adapted to the shape of the desired fiber preform, and said fibers are maintained on the screen through the application of vacuum until, after cooling of the binder material, a sufficient stability of the preform is achieved. A method of this type is described for example in WO 98/22644. By means of the method from WO 98/22644, the reinforcing fibers are preferably arranged as short-cut fibers in random, isotropic arrangement and orientation. According to the examples of WO 98/22644, fiber volume fractions only in the range of up to approximately 15 vol. % are achieved, and thus, because of the low fiber volume fractions, only a comparatively low thickness-related strength of the components.

To achieve higher fiber volume percentages in preforms or components produced therefrom, it is advantageous according to the embodiments from WO 2012/072405 to deposit the short-cut fibers in the form of bundles of reinforcing fibers, wherein the fiber bundles preferably have a length in the range from 10 to 50 mm. In addition, it is advantageous, in consideration of the achievable mechanical characteristics, if the bundles have the lowest possible number of reinforcing fiber filaments, wherein a number of 1000 to 3000 filaments is particularly preferred. In this way, a virtually isotropic material is created with virtually isotropic mechanical characteristics in the directions of extension thereof. At the same time, due to the relatively small bundle dimensions, this material has no or only few regions with increased resin proportion, and thus a reduced reinforcing fiber proportion, which regions can lead to weak points in the component. It is relatively easy to see that the use of bundles of reinforcing fibers with low linear density, i.e., with low filament counts, leads to increased costs, in particular due to the use of relatively high-priced source materials as well. On the other hand, although the use of high linear density fiber bundles, i.e., of fiber bundles with a high number of reinforcing fiber filaments, is indeed more cost effective, high fiber volume percentages, as already explained, can be realized only with difficulty, if at all.

There exists therefore a need for automatable deposition devices for the deposition of bundles of reinforcing fibers to produce a fiber preform, by means of which devices a cost-effective production of fiber preforms is possible while achieving high fiber volume percentages in the fiber preforms or in the composite components produced therefrom.

BRIEF SUMMARY

It is therefore the object of the present disclosure to provide a device of this type for controlled deposition of reinforcing fiber bundles.

The object according to the invention is achieved by a deposition device for the controlled deposition of reinforcing fiber bundles on a surface, wherein the deposition device has a deposition head and a controllable positioning unit which is connected to the deposition head and by means of which the deposition head can be moved relative to the surface, wherein the deposition device further comprises means for providing at least one continuous, ribbon-shaped strand of reinforcing fibers provided with a binder, and a first conveying device arranged on the deposition head for conveying the at least one continuous, ribbon-shaped strand of reinforcing fibers provided with a binder to the deposition head, wherein the deposition device is characterized in that means for spreading the at least one continuous, ribbon-shaped strand of reinforcing fibers are arranged on the deposition head in front of the first conveying device when viewed in the conveying direction, the deposition head has, when viewed in the conveying direction, a second conveying device arranged after the first conveying device, a longitudinal splitting device arranged between the first and second conveying devices and having at least one splitting element for splitting the at least one strand of reinforcing fibers along the longitudinal extension thereof into two or more partial strands, and a cut-to-length unit arranged after the second conveying device in the conveying direction for cutting-to-length the two or more partial strands into fiber bundles.

By means of the device, it is possible to produce fiber preforms from reinforcing fiber bundles having low numbers of reinforcing fiber filaments, and thereby realize high fiber volume percentages in the fiber preform, and the fiber composite component produced therefrom. By this means, continuous ribbon-shaped strands, for example in the form of cost-efficient, high linear density reinforcing fiber yarns, can be used as the source material. High linear density reinforcing fiber yarns of this type can initially be split by means of the longitudinal splitting device into several partial strands along the extension of the reinforcing yarn filaments forming the yarns, wherein the individual partial strands then have a reduced number of filaments compared to the original yarn.

DETAILED DESCRIPTION

In a preferred embodiment, the longitudinal splitting device has a plurality of splitting elements, by means of which the at least one strand of reinforcing fibers fed to the deposition device can be divided into more than two partial strands. As a result, the number of filaments in the individual partial strands is further reduced, by which means fiber bundles with smaller widths are obtained. The use of fiber bundles of this type with smaller width in turn has advantageous effects on the fiber volume fraction in the fiber preform produced therefrom or in the resulting composite component.

The device according to the invention is suited in particular for the production and deposition of fiber bundles of reinforcing fibers such as carbon, glass, or aramid fibers or mixtures of these fibers among themselves or with thermoplastic fibers.

In the deposition device, the deposition head is connected to a controllable positioning unit, by means of which the deposition head can be moved relative to the surface. In one embodiment, the controllable positioning unit comprises an articulated arm robot, located on a machine base, and a robotic joint held by the articulated arm, via which the deposition head can be positioned in at least two axes relative to the surface. In a further embodiment, the controllable positioning unit comprises a gantry structure in which the deposition head is fixed via an articulated head and via which the deposition head can be positioned in at least two axes relative to the surface. The deposition head can be preferably positioned in at least 6, and particularly preferably, in at least 9 axes.

As previously stated, the deposition device described herein has a machine base, an arm located on the machine base, and a robotic joint held by the arm and moveable about axes in multiple spatial directions, as well as a deposition head connected to the robotic joint, which deposition head can be moved about multiple axes relative to a surface by means of the robotic joint. Devices with such elements are known from the prior art and are often used for the deposition of reinforcing fiber products on surfaces. A deposition device having the previously listed elements is described, e.g., in U.S. Pat. No. 5,022,952 for the deposition of reinforcing fiber yarn strands, for example for producing wound bodies. By means of robotic-based devices of this type, movements for example of the deposition head in six axes are possible.

The deposition device described herein comprises, as previously stated, means for supplying at least one continuous, ribbon-shaped strand of reinforcing fibers provided with a binder. These means can be a support device or an arrangement of support devices for one or more spools from which a strand or multiple strands of reinforcing fibers can be unwound under tension control or delivered under speed control. These means for providing the at least one continuous strand of reinforcing fibers can be mounted on the machine base or the arm of the deposition device. The means for providing the at least one strand of reinforcing fibers are preferably located on the deposition head and are connected thereto. As a result, during the application an especially uniform and stable feeding of the at least one strand of reinforcing fibers to the means for spreading the at least one continuous, ribbon-shaped strand and to the first conveying device can be realized.

To securely position the at least one ribbon-shaped strand, to increase the width thereof, and to achieve a good result for the longitudinal cutting device, means for spreading out or spreading apart the at least one continuous, ribbon-shaped strand are arranged in front of the first conveying device when viewed in the conveying direction of the at least one continuous, ribbon-shaped strand through the deposition device. Individual fixed and/or rotatably mounted rods or rollers or arrangements of multiple rods or rollers are suited for this purpose, via which the thread tension can be increased in the strand. The surface of the rods should be advantageously constituted so that abrasion of the yarn strands fed over the rods is kept low. Known surfaces and materials can be used for this purpose. The rods are preferably arranged so that the at least one continuous, ribbon-shaped strand is fed with an angle of wrap greater than 20° around the rods.

The deposition device described herein has, in a preferred embodiment, devices for lateral guiding of the at least one continuous, ribbon-shaped strand of reinforcing fibers so that said strand is fed directly and without lateral deviations through the individual conveying and splitting devices. By this means, a clean cut with clean cut edges can be achieved in the longitudinal splitting device, because the cut can take place at least substantially parallel to the filaments of the at least one strand. For this purpose, rods, rolls, rollers, or other guiding devices, as well as possibly the conveying devices, are aligned at right angles to the conveying direction of the at least one ribbon-shaped strand as well as parallel to each other. In addition, in a preferred embodiment, rods, rolls, rollers, and other guiding elements, via which the at least one ribbon-shaped strand is guided, can be convex at the respective contact points with the strand. The contour of the guide elements in the region of the convexity preferably has a radius in the range from 50 to 600 mm.

In one embodiment, said device can be configured so that multiple continuous, ribbon-shaped strands of reinforcing fibers provided with a fusible binder are provided to the device and can be processed in said device to bundles of reinforcing fibers. For this purpose, the device described herein preferably comprises multiple devices for guiding the individual strands of reinforcing fibers, so that the individual strands are fed straight and without lateral deviations through the conveying and splitting devices.

When using the deposition device according to the invention to produce reinforcing fiber bundles and to deposit said bundles on a surface, it is favorable for the longitudinal and transverse cutting process (cut-to-length process) if the at least one strand of reinforcing fibers is fed under tension through the deposition device, and in particular if a tension is generated in the at least one strand of reinforcing fibers between the first and second conveying devices. By this means, secure flattening and good spreading for the at least one strand of reinforcing fibers and a stable movement of the at least one strand of reinforcing fibers are achieved, which in particular leads to a good cutting result in the longitudinal splitting device. Therefore, it is advantageous if the speeds of the first and second conveying devices can be adjusted such that the speed of the second conveying device is higher than that of the first conveying device.

The first and/or second conveying device consists in an advantageous embodiment of the deposition device of one or more rolls or rollers provided with a drive, by means of which the at least one strand can be transported. The rolls or rollers can be arranged with respect to each other such that in the application, the at least one strand of reinforcing fibers can loop around the rolls or rollers. In a further preferred embodiment, the first and/or second conveying device comprises a driven pair of rollers, the speed of which can be controlled, with an adjustable gap between the rollers of the roller pair, through which gap the at least one strand of reinforcing fibers is conveyed as a result of the pressure exerted by the roller pair during the application.

In addition, in a likewise preferred embodiment, the first and/or second conveying device can comprise a blowing device, by means of which the at least one continuous, ribbon-shaped strand of reinforcing fibers provided with a fusible binder can be conveyed. For this purpose, the blowing device is coupled to an air supply that can be regulated.

The longitudinal splitting device comprises at least one splitting element for splitting the at least one strand of reinforcing fibers along the longitudinal extension thereof. The at least one splitting element of the longitudinal splitting device can be at least one laser beam arrangement, air jet arrangement, or water jet arrangement, or a mechanical splitting element, e.g. in the form of at least one fixed element, e.g. a fixed knife, or also in the form of at least one rotating splitting disk, which is preferably provided with a drive. The drive can be regulated and designed such that a speed difference can be adjusted between the circumferential speed of the at least one splitting disk and the conveying speed of the at least one strand of reinforcing fibers passing through the longitudinal splitting device. The rotational direction of the at least one rotating splitting disk can be in the conveying direction of the at least one ribbon-shaped strand or also opposed to it. It has been thereby found to be advantageous for the application if the circumferential speed of the at least one splitting disk can be adjusted to be 2 to 15% higher than the conveying speed of the at least one strand passing through the longitudinal splitting device.

In a preferred embodiment of the deposition device, the longitudinal splitting device comprises, in the case that the at least one splitting element is a mechanical splitting element, a force-controlled hold-down device, by means of which the at least one splitting element and the at least one strand of reinforcing fibers to be split along the longitudinal extension thereof can be pressed against each other with a defined force. The at least one rotating splitting disk can, for example, thereby be connected to a force-controlled hold-down device, by means of which the rotating splitting disk is pressed with a defined force against the at least one strand of reinforcing fibers to be split along the longitudinal extension thereof. Preferably, the hold-down device is arranged such that in the application of the deposition device the at least one strand is pressed against the at least one mechanical splitting element by the hold-down device. When used in the case in which the at least one strand of reinforcing fibers has a twist, for example a yarn twist in the case that the strand is a yarn, a splitting of the strand in the region of the twist transverse to the fiber direction can be avoided by means of a hold-down device of this type. An existing partial splitting of the strand transverse to the fiber direction can lead to tearing of the strand and as a result to an interruption of the cutting process, and thus of the deposition process.

The number of splitting elements of the longitudinal splitting device is determined by the number of strands of reinforcing fibers that should be split along the longitudinal extension thereof using the longitudinal splitting device, and by the number of partial strands that should be obtained. When supplying multiple continuous, ribbon-shaped strands of reinforcing fibers provided with a fusible binder, i.e., multiple strands of reinforcing fibers, these strands can be fed by means of suitable guiding devices via the first conveying device to the longitudinal splitting device such that said strands are arranged superposed, i.e., they lie on top of each other. In this case, the ribbon-shaped strands can be cut together by the same splitting elements in the longitudinal direction. For example, the longitudinal splitting device then has two splitting elements for the case in which two ribbon-shaped yarn strands should each be cut into three partial strands.

With respect to, for example, the means for providing as well as the devices for lateral guiding, the deposition device described herein is preferably configured such that, when supplying multiple strands of reinforcing fibers, said strands are arranged adjacent to each other. The longitudinal splitting device then comprises multiple splitting elements, the number of which is determined by the number of partial strands that should be produced from the adjacently arranged multiple strands of reinforcing fibers. For example, the longitudinal splitting device has four splitting elements when two adjacently arranged, ribbon-shaped yarn strands should each be cut into three partial strands.

The at least one splitting element can be arranged relative to the devices for lateral guiding of the at least one continuous, ribbon-shaped strand of reinforcing fibers such that the at least one strand is divided centrally or off-center into partial strands. Likewise, in the case of an individual strand of reinforcing fibers, which should be split into three or more partial strands, or also in cases of multiple strands of reinforcing fibers preferably arranged adjacent to each other, the multiple splitting elements can be arranged relative to each other and/or relative to the devices for lateral guiding such that partial strands of differing widths result in the application of the deposition device according to the invention.

The partial strands obtained in the longitudinal splitting device are cut transverse to the extension direction thereof into fiber bundles of defined length by means of the cut-to-length unit. In a preferred embodiment of the deposition device, the cut-to-length unit is coupled to the conveying devices such that, when changing the conveying speed, the frequency of the transverse cutting is changed so that the length of the resulting reinforcing fiber bundles remains the same. In a further preferred embodiment, the frequency of the transverse cutting can be adjusted independent of the conveying speed so that, when the conveying speed remains the same, different lengths of reinforcing fiber bundles can be produced. Of course, a combination of the adjustment possibilities is also comprised by the invention, for which combination on the one hand the conveyor speed serves as the regulated quantity for the frequency of the transverse cutting but the frequency of the transverse cutting can be varied at a set conveying speed.

With regard to the cut-to-length unit, known assemblies for cutting reinforcing fibers transverse to the extension direction thereof can be used. Assemblies of this type include, for example, assemblies for water- or air jet cutting of fibers, for cutting fibers by means of laser beams, assemblies with e.g. pneumatically driven guillotine knives transverse to the conveying direction, rotating transverse cutters with cutting roller and counter roller, or also rotating cutting blades, the rotational axis thereof extending in the conveying direction of the partial strands, or at an angle thereto of up to 60°, preferably up to 20°. The latter rotating cutting blades are disclosed for example in DE 20 2010 017 556 U1 or EP-A-2 351 880 A1. In a preferred embodiment, a rotating transverse cutter is used in which the blades are pressed against the strand of reinforcing fibers to be cut without exerting a substantial counter pressure on the other side of the strand. This method leads, in the case of brittle reinforcing fibers, such as carbon fibers or glass fibers, to a brittle fracture at the load point and thus, to a clean cutting-to-length of the strand of reinforcing fibers. Assemblies of this type are described e.g. in EP-A-1 144 738, EP-A-1 394 295, EP-A-1 723 272, or WO 02/055770, to which reference is explicitly made concerning their disclosure in this regard.

In a preferred embodiment, the deposition device has in the conveying direction a device for transporting the fiber bundles away after the cut-to-length unit. This can be, e.g. a short conveyor belt. The device for transporting the fiber bundles away is particularly preferably a nozzle head that can be pressurized with compressed air, which nozzle head has a nozzle channel via which the fiber bundles can be removed from the cut-to-length unit by means of compressed air and can be carried out of the nozzle head. By this means, the fiber bundles can be deposited with increased speed, i.e., sprayed, on a surface to produce a fiber preform. For this purpose, a Venturi nozzle is preferably arranged in the nozzle channel of the nozzle head for introducing the compressed air into the nozzle channel.

In a further preferred embodiment, the nozzle head has means for introducing matrix material into the nozzle channel. For this type of embodiment of the deposition device described herein, the cut-to-length fiber bundles, together with a matrix material, can be carried out or sprayed on a surface via the nozzle head. The means for introducing matrix material can be e.g. a Venturi nozzle, which projects into the nozzle channel and via which matrix particles are introduced into the nozzle channel. It can, however, also be a spray nozzle arranged in the nozzle channel, by means of which spray nozzle liquid matrix material can be sprayed in. The feeding of matrix material can be advantageous in order to effect, during deposition of the fiber bundles produced by means of the deposition device on a surface, a better adhesion to each other due to the matrix material and thus a better fixing of the fiber bundles among each other and on the surface.

Likewise, with respect to a better adhesion to each other and thus a better fixing of the fiber bundles among each other and on the surface, it can be advantageous to heat the fiber bundles in order to thus activate, i.e., bring into a melted state, the fusible binder located on the bundles. After the fiber bundles contact the surface of the fiber preform to be produced, and after cooling, the fiber bundles are fixed via the then re-solidified binder. For this purpose, the device described herein has, in a preferred embodiment, means for heating the fiber bundles after the cut-to-length unit when viewed in the conveying direction. Hot gas streams, heated ambient air, laser radiation, infrared radiation, and the like can be considered as means for heating the fiber bundles.

Figure 1:
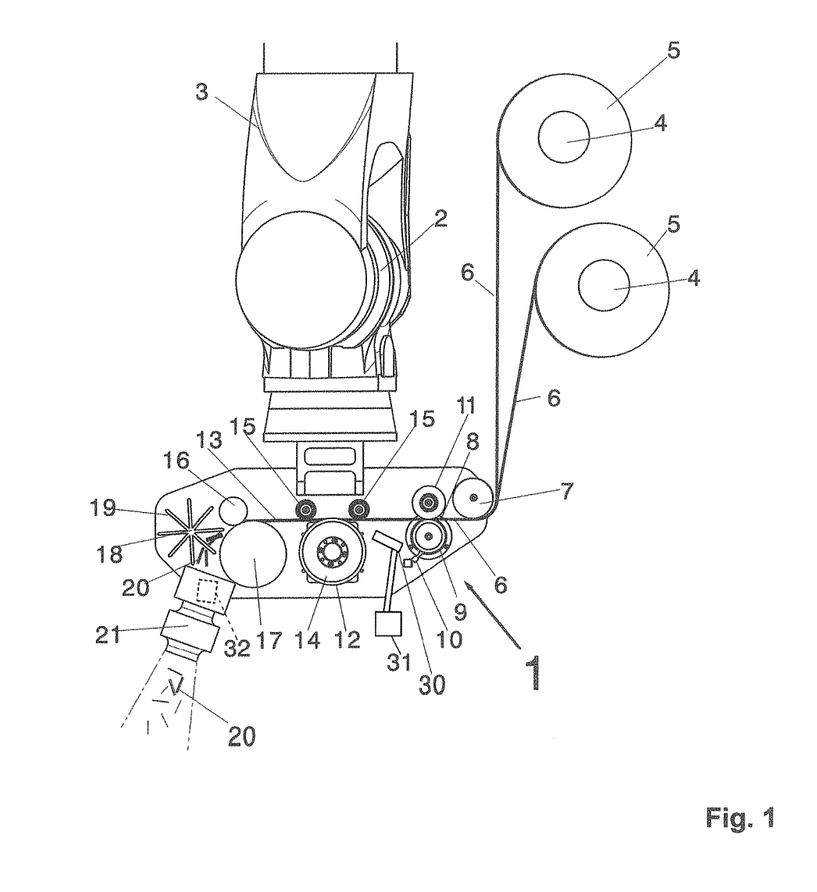
FIG. 1: Side view of a segment of the deposition device with deposition head.

The deposition device will be explained in the following by way of the schematic representations in the figures. The content of the figures is as follows:

FIG. 1 shows a schematic representation of a segment of a deposition device, in which the deposition head 1 is connected to a controllable positioning unit 3 via a joint 2. Two supply devices 4 for spools 5 as means for providing the ribbon-shaped strands 6 of reinforcing fibers provided with a binder are connected in this case to the deposition head 1, which supply devices are preferably driven by means of control motors. The connection between the deposition head 1 and the supply devices can take place using suitable brackets (not shown here).

From the spools 5 located on the supply devices, ribbon-shaped strands 6 of reinforcing fibers provided with a binder are unwound and guided around a spreader roller 7, which is preferably convexly designed. By means of the spreader roller 7, the strands 6 are spread out and if necessary spread apart. Due to the convex design of the spreader roller 7, a lateral guiding of the strands 6 can be simultaneously effected.

Figure 4:
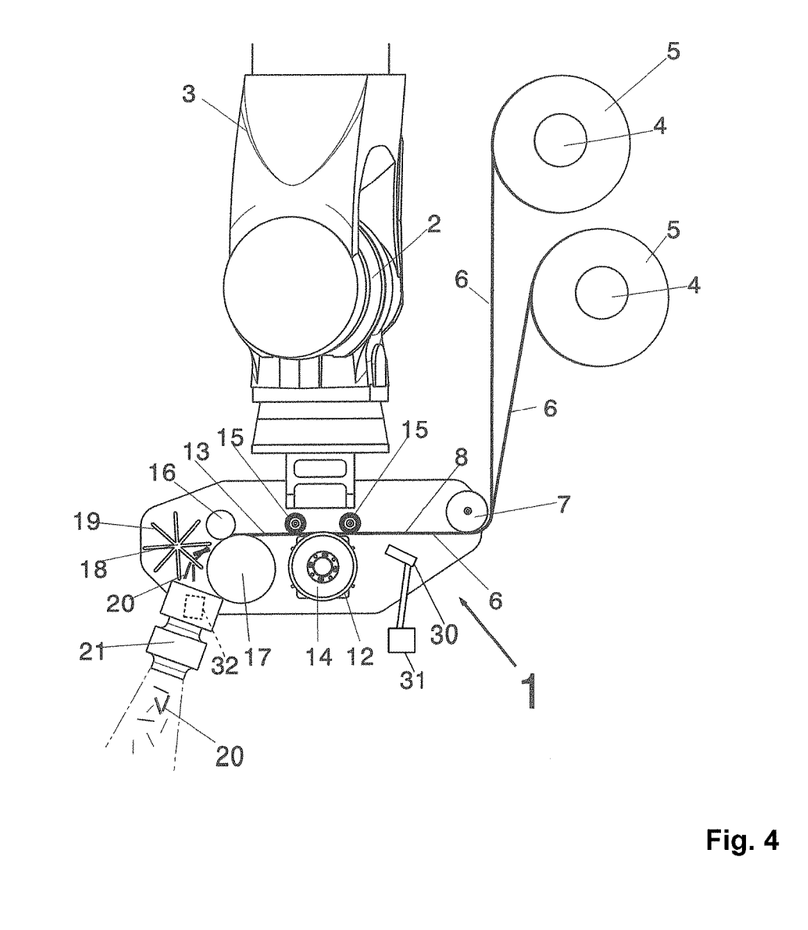
FIG. 4: Another side view of a segment of the deposition device with deposition head.

From the spreader roller 7, the strands 6 are fed to a first conveying device 8, which comprises a driven roller pair in the deposition device in FIG. 1. For this purpose, the lower roller 9 is pressed by means of a tensioning device 10 against the upper roller 11, which is provided with a rubber coating so that a conveying of the strands 6 can take place without slippage. The conveying device may also include a blowing device 30 connected to an air supply 31. Alternatively, as shown in FIG. 4, the first conveying device 8 may comprise a blowing device 30 connected to an air supply 31.

After passing through the first conveying device 8, the strands 6 are fed to the longitudinal splitting device 12, in which the strands 6 are cut along the extension direction thereof into partial strands 13. An arrangement of a plurality of rotating splitting disks 14 serves this purpose, against which the strands 6 to be split are pressed with a defined force by means of two force-controlled hold-down rollers 15. The partial strands 13 obtained in the longitudinal splitting device 12 are fed to the second conveying device 16, likewise implemented as a driven roller pair. By setting a speed difference between the second conveying device 16 and the first conveying device 8, in which the conveying speed of the second conveying device 16 is set slightly higher than that of the first conveying device 8, a defined tension can be applied to the strands 6 and the partial strands 13, by which means an improved cutting result is obtained in the longitudinal splitting device 12.

The lower roller 17 of the second conveying device 16 serves simultaneously as a counter roller for the cut-to-length unit 18, implemented as a rotating transverse cutter in the present example, comprising cutting roller 19 and counter roller 17. In the cut-to-length unit 18, the partial strands 13 are cut to reinforcing fiber bundles or fiber bundles 20 with a defined length. The cut-to-length fiber bundles 20 are taken up from the cut-to-length unit by the nozzle head 21 and sprayed, via the nozzle channel of the nozzle head 21, pressurized with compressed air, at high speed onto a surface for producing a fiber preform. As shown in FIGS. 1 and 4, a heating unit 32 may be included to heat the cut-to-length fiber bundles 20 after the cut-to-length unit 18.

Figure 2:
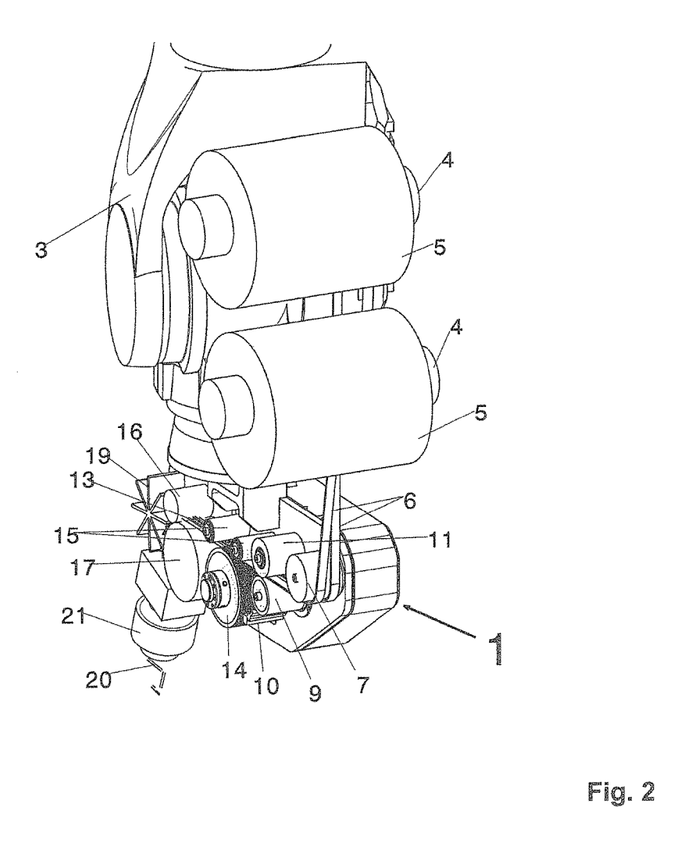
FIG. 2: Isometric representation of the segment of the deposition device from FIG. 1.

FIG. 2 shows for clarification of the spatial arrangement, in particular of the elements of the deposition head, a perspective representation of the segment of a deposition device depicted in FIG. 1, wherein the same reference numbers in the figures relate to the same elements in the device.

Figure 3:
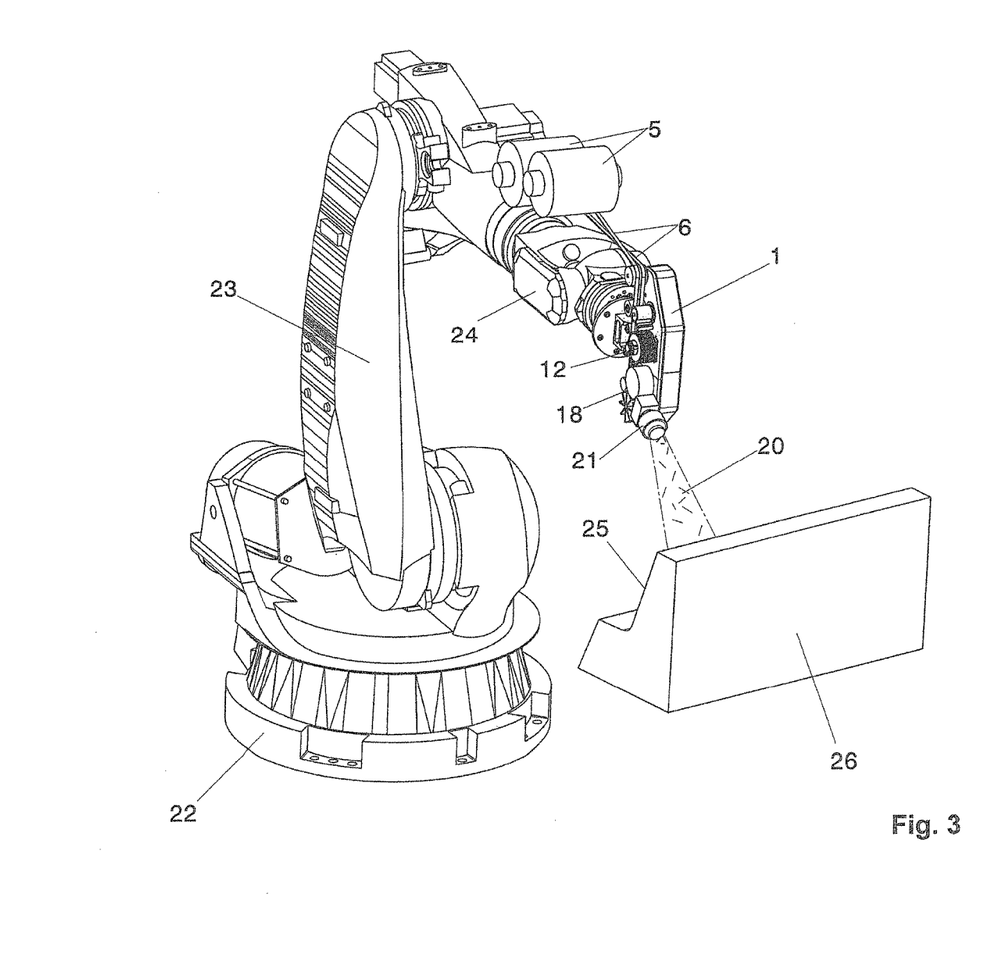
FIG. 3: Deposition device with articulated arm robot.

FIG. 3 shows an embodiment of the device according to the invention, having an articulated arm robot 23 located on a machine base 22, at the end of which arm the deposition head 1 is mounted via a joint 24, and via which the deposition head can be moved in a plurality of axes relative to the surface 25 of a molded body 26 used for producing a fiber preform. By this means, the fiber bundles 20, obtained by means of the longitudinal splitting device 12 and the cut-to-length unit 18 on the deposition head 1 and applied via the nozzle head 21, can be sprayed in defined tracks onto the surface 25 according to the requirements of the structure of the fiber preform to be produced or the composite component to be produced therefrom.

The invention claimed is:

1. A deposition device for controlled deposition of reinforcing fiber bundles on a surface, comprising
 a deposition head,
 a gantry structure or articulated arm robot, connected to the deposition head, and configured to move the deposition head relative to the surface,
 at least one support to which one or more spools may be mounted in order to provide at least one continuous, ribbon-shaped strand of reinforcing fibers provided with a binder,
 a first conveyor arranged on the deposition head and configured to convey the at least one continuous, ribbon-shaped strand of reinforcing fibers provided with a binder through the deposition head,
 a spreader that spreads the at least one continuous, ribbon-shaped strand of reinforcing fibers, the spreader being arranged in front of the first conveyor when viewed in a conveying direction of the at least one continuous, ribbon-shaped strand of reinforcing fibers,
 a second conveyor configured to convey the at least one continuous, ribbon-shaped strand of reinforcing fibers, the second conveyor arranged on the deposition head after the first conveyor when viewed in the conveying direction,
 a longitudinal splitter splitting arranged between the first and second conveyors and configured to split the at least one continuous, ribbon-shaped strand of reinforcing fibers along a longitudinal extension thereof into two or more partial strands, and
 a cutter arranged after the second conveyor in the conveying direction and configured to cut the two or more partial strands into fiber bundles.

2. The deposition device according to claim 1, wherein the longitudinal splitter is configured to cut the at least one strand of reinforcing fibers into more than two partial strands.

3. The deposition device according to claim 1, wherein the first and/or second conveyor comprises a plurality of rollers, wherein the plurality of rollers are configured to transport the at least one strand.

4. The deposition device according to claim 1, wherein the first and/or second conveyor comprises a blower connected to an air supply.

5. The deposition device according to one or more of claim 1, wherein the longitudinal splitter is a rotating splitting disk.

6. The deposition device according to claim 1, further comprising a force-controlled hold-down roller configured to press the longitudinal splitter and the at least one continuous, ribbon-shaped strand of reinforcing fibers to be split along the longitudinal extension thereof against each other.

7. The deposition device according to claim 1, further comprising a heater for heating the fiber bundles after the cutter in the conveying direction.

8. The deposition device according to claim 1, further comprising a transporter configured to transport the fiber bundles away after the cutter in the conveying direction.

9. The deposition device according to claim 8, wherein the transporter is a nozzle head that is configured to be pressurized with compressed air, wherein the nozzle head has a nozzle channel, and wherein the nozzle channel is configured to carry away the fiber bundles from the nozzle head by means of the compressed air.

10. The deposition device according to claim 9, wherein a Venturi nozzle is arranged in the nozzle channel for introducing the compressed air into the nozzle channel.

11. The deposition device according to claim 9, wherein the nozzle head includes a nozzle for introducing matrix particles into the nozzle channel.

12. A deposition device for deposition of reinforcing fiber bundles on a surface, comprising
 a deposition head; and
 at least one support to which one or more spools may be mounted in order to provide at least one continuous strand of reinforcing fibers to the deposition head;
 wherein the deposition head comprises:
  a first conveyor configured to convey the at least one continuous strand of reinforcing fibers through the deposition head;
  a second conveyor arranged after the first conveyor when viewed in a conveying direction of the at least one continuous strand of reinforcing fibers;
  a spreader, configured to spread the at least one continuous strand of reinforcing fibers, arranged in front of the first conveyor when viewed in the conveying direction;
  a longitudinal splitter arranged between the first and second conveyors, and
 configured to split the at least one continuous strand of reinforcing fibers along a longitudinal extension thereof into two or more partial strands; and
  a cutter, configured to cut the two or more partial strands into fiber bundles, arranged after the second conveyor in the conveying direction.

13. The deposition device according to claim 12, further comprising a transporter configured to transport the fiber bundles away from the deposition head, and arranged after the cutter in the conveying direction.

14. The deposition device according to claim 13, wherein the transporter is a nozzle head that comprises a nozzle channel, wherein the nozzle head is configured to be pressurized with compressed air, and wherein the compressed air causes the fiber bundles to flow through the nozzle channel away from the nozzle head.

15. The deposition device according to claim 14, wherein a Venturi nozzle is arranged in the nozzle channel, and the Venturi nozzle is configured to introduce the compressed air into the nozzle channel.

16. The deposition device according to claim 14, wherein a Venturi nozzle is arranged in the nozzle channel, and the Venturi nozzle is configured to introduce a matrix material into the nozzle channel.

17. The deposition device according to claim 12, wherein the spreader has a convex shape.

18. The deposition device according to claim 12, further comprising a heater configured to heat the fiber bundles after the cutter in the conveying direction.

19. A method for controlled deposition of reinforcing fiber bundles on a surface, comprising operating the deposition device recited in claim 1.

20. A method for controlled deposition of reinforcing fiber bundles on a surface, comprising operating the deposition device recited in claim 12.

* * * * *